United States Patent [19]
Bronicki et al.

[11] Patent Number: 5,321,944
[45] Date of Patent: Jun. 21, 1994

[54] POWER AUGMENTATION OF A GAS TURBINE BY INLET AIR CHILLING

[75] Inventors: Lucien Y. Bronicki, Yayne; Uriyel Fisher, Haifa, both of Israel

[73] Assignee: Ormat, Inc., Sparks, Nev.

[21] Appl. No.: 82,819

[22] Filed: Jun. 28, 1993

Related U.S. Application Data

[63] Continuation of Ser. No. 881,763, May 12, 1992, abandoned, which is a continuation-in-part of Ser. No. 818,123, Jan. 8, 1992, abandoned.

[51] Int. Cl.⁵ .................................. F02C 6/00
[52] U.S. Cl. ........................... 60/39.05; 60/728
[58] Field of Search ........... 60/39.05, 39.182, 39.83, 60/728; 415/179

[56] References Cited

U.S. PATENT DOCUMENTS

| | | | |
|---|---|---|---|
| 3,796,045 | 3/1974 | Foster-Pegg | 60/728 |
| 3,877,218 | 4/1975 | Nebgen | 60/728 |
| 4,099,374 | 7/1978 | Foster-Pegg | 60/39.182 |
| 4,418,527 | 12/1983 | Schlom et al. | 60/728 |
| 4,702,074 | 10/1987 | Munk | 60/728 |

FOREIGN PATENT DOCUMENTS

| | | | |
|---|---|---|---|
| 987796 | 4/1951 | France | 60/728 |
| 0143346 | 9/1982 | Japan | 60/728 |
| 0215842 | 9/1988 | Japan | 60/728 |
| 0182638 | 8/1991 | Japan | 60/728 |
| 0204 | 10/1983 | South Africa . | |
| 2051238 | 1/1981 | United Kingdom | 60/728 |

OTHER PUBLICATIONS

Ondryas et al., "Options in Gas Turbine Power Augmentation Using Inlet Air Chilling", Presented at the Gas Turbine and Aeroengine Congress and Exposition–Jun. 11–14, 1990, Brussels, Belgium.

*Primary Examiner*—Richard A. Bertsch
*Assistant Examiner*—Timothy S. Thorpe
*Attorney, Agent, or Firm*—Sandler, Greenblum & Bernstein

[57] ABSTRACT

In order to augment the power produced by a gas turbine system of a type having an air compressor for producing compressed air, a combustor for heating the compressed air, and a gas turbine responsive to the heated air for driving the air compressor and the load, cooling air is supplied to the compressor by indirectly contacting the air with water that is chilled by flashing some of the water into a vapor.

15 Claims, 8 Drawing Sheets

POWER AUGMENTATION OF A GAS TURBINE BY INLET AIR CHILLING

This application is a continuation of application Ser. No. 07/881,763, filed May 12, 1992, now abandoned; which is a continuation in-part of application Ser. No. 07/818,123, filed jan. 8, 1992, now abandoned. which is expressly incorporated by reference thereto in its entirety.

TECHNICAL FIELD

This invention relates a method of and apparatus for augmenting the power of a gas turbine by chilling the inlet air to the compressor of the gas turbine.

BACKGROUND ART

In a paper, hereby incorporated by reference, entitled "Options in Gas Turbine Power Augmentation Using Inlet Air Chilling" by I. S. Ondryas et. al. presented at the Gas Turbine and Aeroengine Congress and Exposition on Jun. 11-14, 1990 in Brussels, Belgium, the authors discuss the use of adsorption chillers and/or mechanical/electrical chillers for cooling inlet air in a gas turbine based cogeneration plant. Such cooling increases the capacity of the plant, particularly during peak demand periods in the summer. The cost of equipment to effect such cooling is amortized by the economic benefit gained from increased revenues derived during peak operations.

Although the paper discloses using heat contained in gases exhausted from the gas turbine to generate steam that is applied to an adsorption chilling system based on lithium bromide, or ammonia, an economic comparison is made of systems based on a centrifugal, two-stage ammonia based adsorption system, and a hybrid of these two techniques. The paper shows that, in terms of shortest payback period, a two-stage ammonia adsorption system is the most attractive.

The conventional refrigeration systems described in the above-identified article are capable of providing low temperatures for air conditioning, refrigeration, and ice making purposes, which are significantly below the minimum 45° F. temperature considered suitable for inlet air chilling in a gas turbine based power plant. Inlet air temperatures lower than about 45° F. should be avoided to prevent ice build-up on the compressor blades taking into account a drop of about 10° F. in the static air temperature in the compressor inlet, and a 3° F. safety margin. Conventional refrigeration systems to achieve these rather modest cooling goals without using chlorinated fluorocarbons (CFC's) which are ecologically damaging, and high voltage electrical components to support chiller motors, etc., are often complicated, and hence expensive, reducing the advantages of inlet air chilling.

It is therefore an object of the present invention to provide apparatus for augmenting the power produced by a gas turbine system which is simpler in design and operation than apparatus of this type disclosed in the above-identified paper.

BRIEF DESCRIPTION OF HTE INVENTION

The present invention provides apparatus and method for augmenting the power produced by a gas turbine system of the type having an air compressor for producing compressed air, a heater such as a combustor for heating the compressed air, a gas turbine responsive to the heated air for driving the air compressor and a load, and for producing exhaust gases. The apparatus according to the invention comprises means for cooling the air supplied to the compressor, the cooling means preferably including a closed contact heat exchanger through which air is supplied to the compressor, a closed reservoir of water, and means for exchanging water between the reservoir and the heat exchanger. According to the present invention, an auxiliary compressor is provided having an inlet preferably connected to the reservoir and having an outlet. Drive means are provided for operating the auxiliary compressor to reduce the pressure in the reservoir thereby flashing some of the liquid water into water vapor which reduces the temperature of the liquid water remaining in the reservoir. The water vapor is compressed by the operation of the auxiliary compressor to produce heated, compressed water vapor at the outlet of the compressor. A condenser is connected to the outlet for condensing the heated, compressed water vapor into liquid condensate, and means connecting the condenser to the reservoir for controlling the return of the liquid condensate to the reservoir. The cooling effected by the flash operation that occurs in the reservoir is sufficient to produce a water temperature in the reservoir suitable for use in cooling the inlet air to the compressor of the gas turbine.

To further improve the efficiency of the system, the present invention may include drive means for operating the auxiliary compressor using heat extracted from the exhaust of the turbine. In such case, the drive means may include a vaporizer responsive to the exhaust gases from the gas turbine for converting liquid working fluid to vaporized working fluid, and an auxiliary turbine mechanically coupled to the auxiliary compressor and responsive to the vaporized working fluid for expanding the latter thereby driving the auxiliary compressor and producing heat depleted working fluid. An auxiliary condenser condenses the heat depleted working fluid, and means are provided for pumping the condensate from the auxiliary condenser into the vaporizer.

BRIEF DESCRIPTION OF THE DRAWINGS

Embodiments of the present invention are described by way of example and with reference to the accompanying drawings wherein.

DETAILED DESCRIPTION

Figure 1:
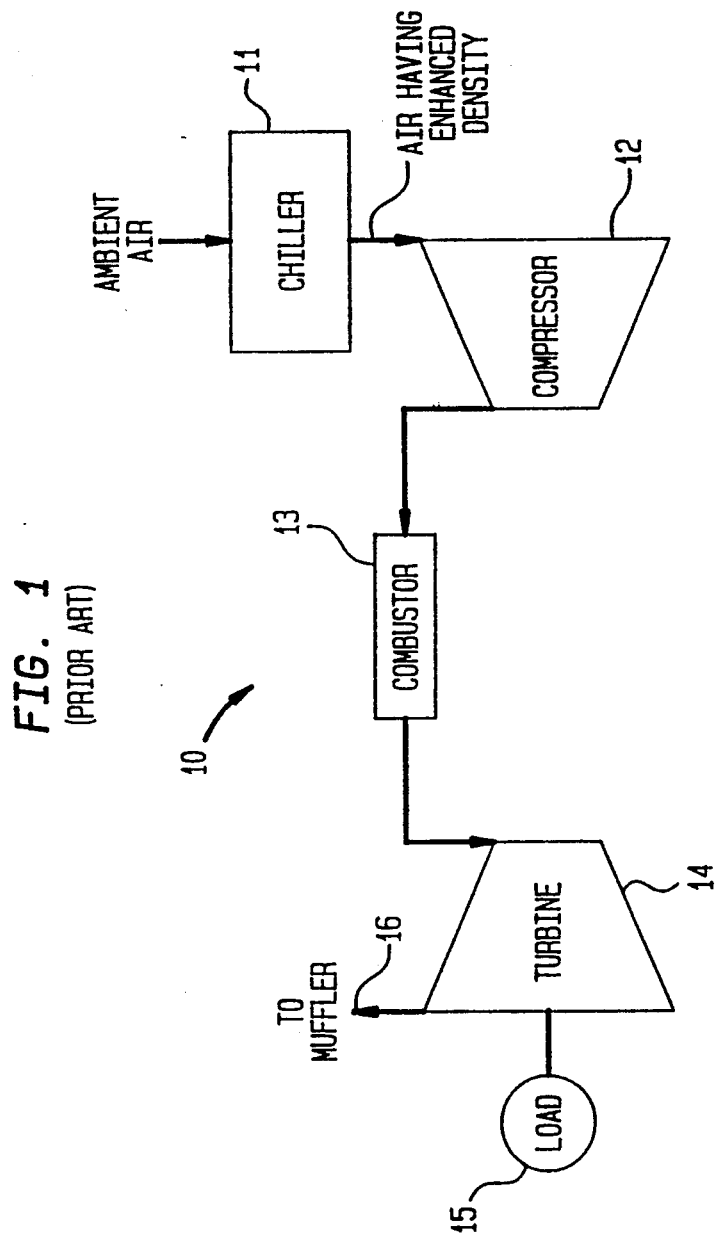
FIG. 1 is a block diagram of a prior art gas turbine system having conventional apparatus for augmenting the power produced.

Turning now to the drawings, reference numeral 10 in FIG. 1 represents a plant based on a gas turbine system and using inlet air chilling. Specifically, ambient air enters chiller 11 which may operate in accordance with the principles described in the above-identified paper, the air being significantly cooled to a temperature around 45° F. The cool air enters air compressor 12 which compresses the air before it is supplied to combustor 13. Fuel is burned in combustor 13 for producing hot gases that are applied to gas turbine 14 which drives load 15 which may be an electrical generator for producing electricity. Gases exhausted from turbine 14 are usually applied to muffler 16 before being vented to the air.

As described in the above-identified paper, the output of the turbine is increased by 0.36% for each 1° F. reduction in inlet air temperature. For example, if the ambient air temperature is 95° F., which represents, on the average, ambient temperature on a typical summer day in the United States when peaking is required, and if the chilled temperature is 52° F., the 43° F. reduction in temperature would result in a 15.5% boost in the output of the turbine.

Figure 2:
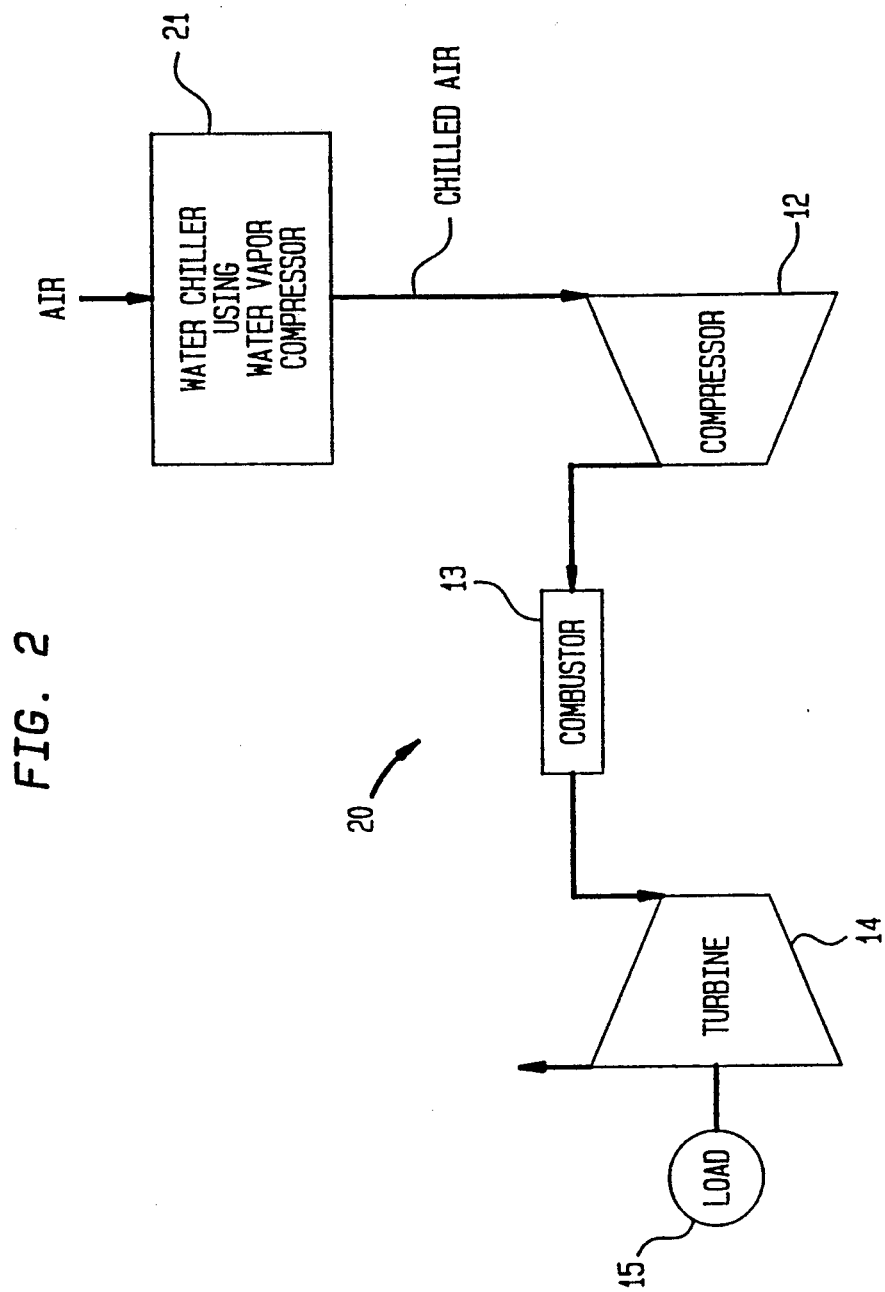
FIG. 2 is a schematic block diagram of an embodiment of the present invention schematically showing a water chiller that utilizes a water vapor compressor.
Figure 2A:
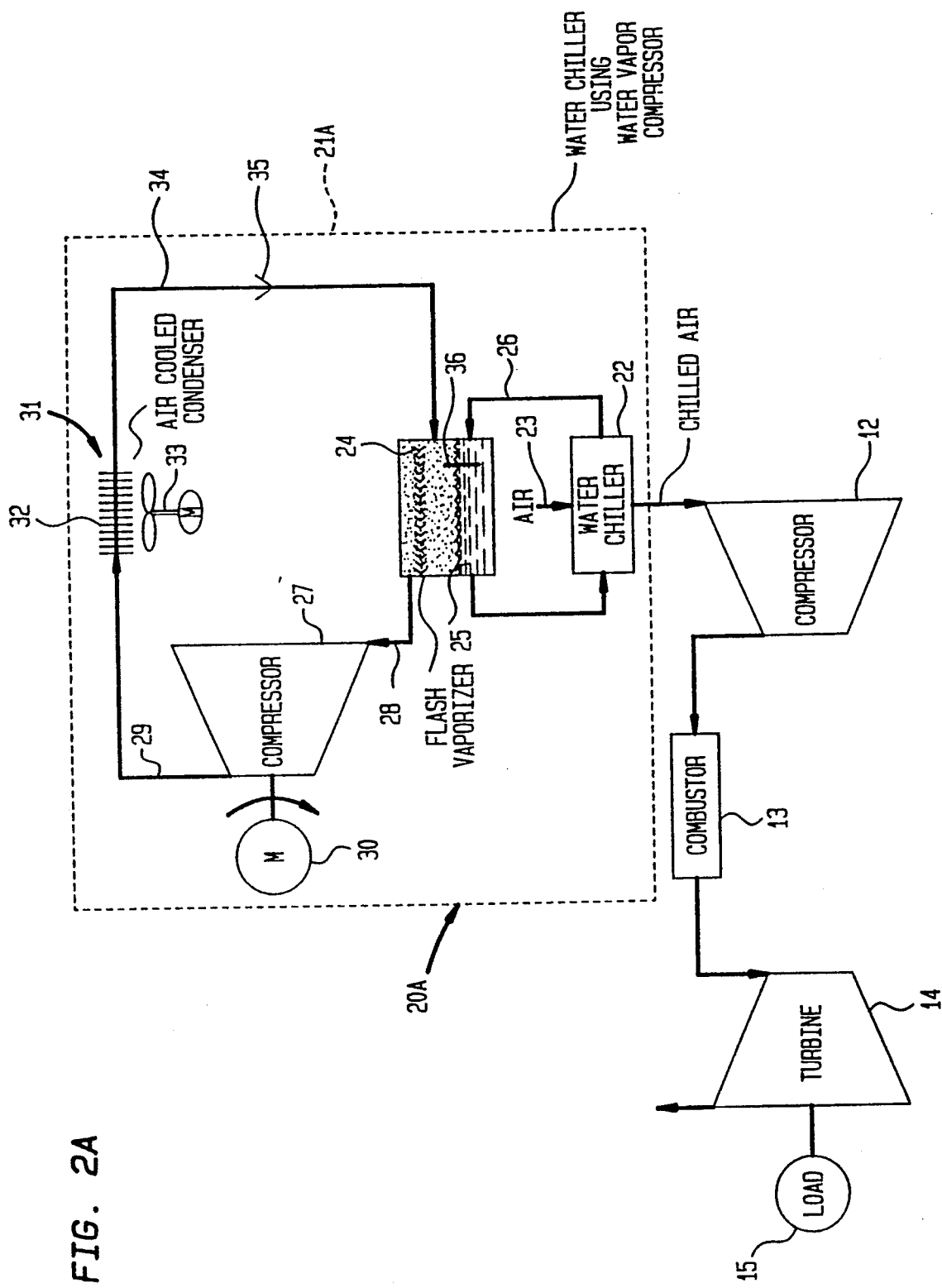
FIG. 2A is a schematic diagram of one embodiment of an air chiller according to the present invention.

An embodiment of the present invention is illustrated in FIG. 2 wherein ambient air enters chiller 21, which utilizes a water vapor compressor, is cooled thereby, and enters compressor 12 which operates in the manner described previously. Chiller 21 may have several configurations, one of which is illustrated in FIG. 2A to which reference is now made. As shown in FIG. 2A, power plant 20A includes chiller 21A that utilizes a water vapor compressor. Specifically, chiller 21A includes indirect contact heat exchanger 22 through which air, usually ambient air, at 23 is supplied to the inlet of compressor 12. Chiller 21A also includes flash vaporizer 24 which is in the form of a closed reservoir containing water 25. Means 26, which may include a pump (not shown) effects the exchange of water between the reservoir and heat exchanger 22.

Chiller 21A also includes auxiliary compressor 27 having inlet 28 connected to the vaporizer and having outlet 29 through which the gas compressed by compressor 27 exits the compressor. Motor 30 constitutes drive means for operating auxiliary compressor 27 such that the pressure inside the vaporizer 24 is reduced thereby flashing some of water 25 into vapor (steam) and reducing the temperature of water 25 remaining in the vaporizer. Auxiliary compressor 27 driven by motor 30 compresses the water vapor drawn from vaporizer 24 producing heated, compressed steam at outlet 29.

Chiller 21A also includes condenser 31 connected to outlet 29 of the compressor for condensing the heated, compressed steam flowing through the condenser. Specifically, condenser 31 is in the form of an air cooled condenser comprising finned tubes 32 over which ambient air is blown by reason of the operation of blower 33. The result of this arrangement is the condensation of the heated compressed steam as supplied to the condenser. Means 34, in the form of suitable piping, connect the outlet of condenser 31 to vaporizer 24 via constriction valve 35 in the piping. Valve 35 is provided for the purpose of controlling the return of liquid condensate produced by the condenser to the vaporizer.

Water chillers similar to that shown in FIG. 2A are shown and described in South African Patent No. 83/0204 issued Oct. 26, 1983, the subject matter of which is hereby incorporated by reference. In the operation of the apparatus shown in FIG. 2A, air, usually ambient air, enters water chiller 22 where it is cooled to a suitable low temperature, for example, around 45° F., before entering compressor 12 wherein the chilled air is compressed before being supplied to combustor 13. There, fuel is mixed with and burned in the air and the resulting hot gases are supplied to gas turbine 14 for driving load 15.

Motor 30 driving auxiliary compressor 27 produces a below atmospheric pressure within vaporizer 24 thereby flashing some of water 25 into steam which is compressed and heated by the compressor. The compressed steam exits outlet 29 before entering condenser 31 where the steam is condensed. Condensate produced by the condenser is returned through nozzle 35 to the vaporizer. Baffle 36, preferably present in the vaporizer, serves to separate the warmer water returned from chiller 22 from the cooler water produced by vaporization in the flash chamber. The heat extracted from the air as it passes through chiller 22 is transferred to water 25 in the vaporizer, and the heat therein is transferred to the air by reason of the operation of condenser 31.

Figure 2B:
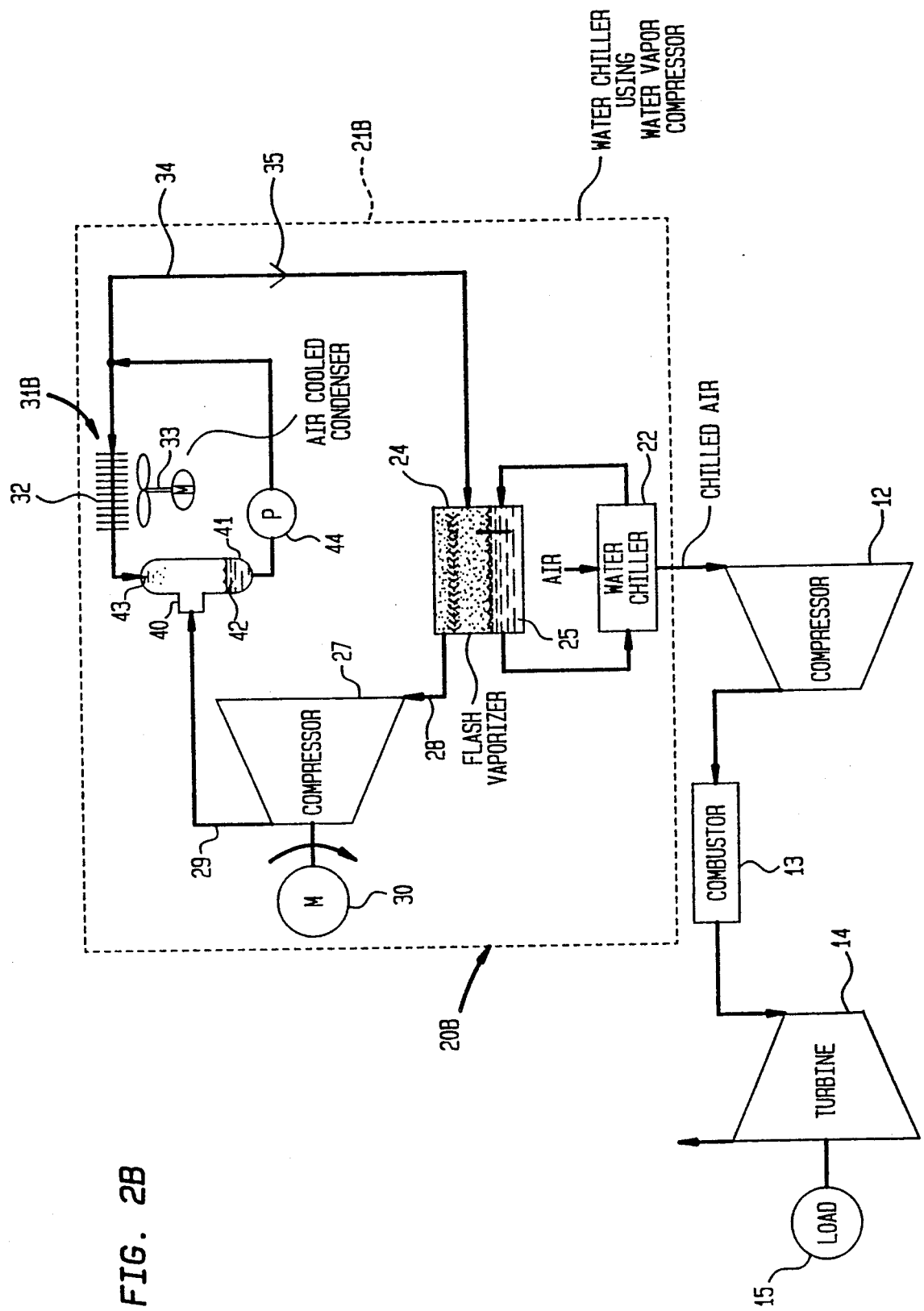
FIG. 2B is a second embodiment of an air chiller according to the present invention.
Figure 2C:
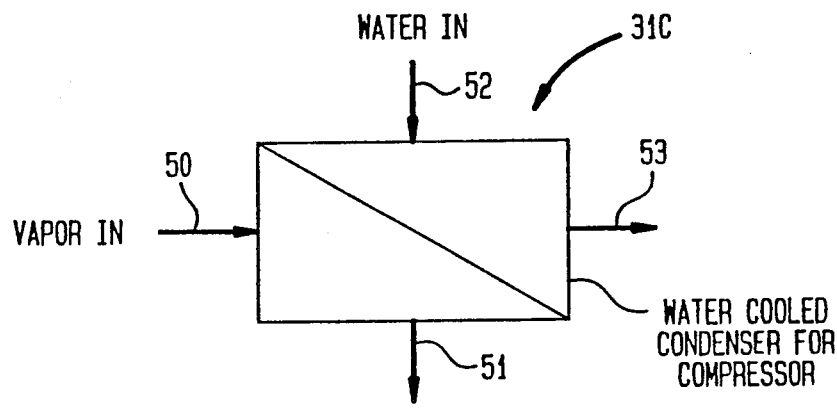
FIG. 2C is a diagram showing a further modification of a condenser for a water chiller according to the present invention.
Figure 2D:
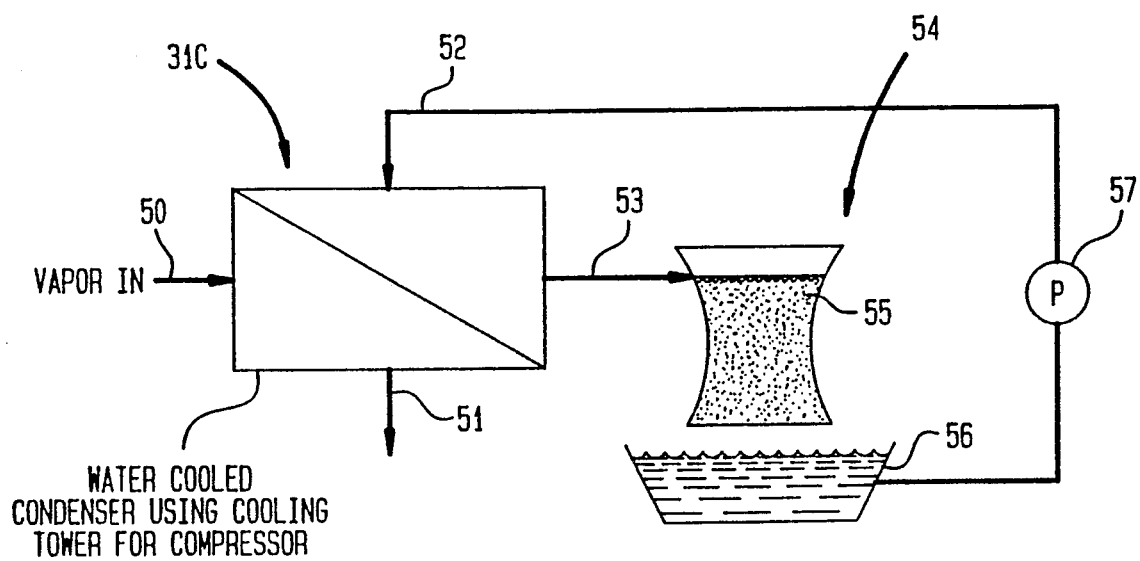
FIG. 2D is a further modification of the condenser shown in FIG. 2C.

In embodiment 21B of the water chiller shown in power plant 20B in FIG. 2B, the condenser of the chiller is modified from what is shown in FIG. 2A. Specifically, condenser 31B shown in FIG. 2B includes direct contact heat exchanger 40 having sump 41 containing water 42, and spray head 43. Pump 44 pumps some of water 42 from the sump through finned tubes 32 of the condenser and the balance of the water is throttled at 35 and returned to vaporizer 24. Finned tubes 32 cool the water before it is applied to sprayhead 43 which produces droplets that directly contact the heated, compressed steam produced by auxiliary compressor 27. Finned tubes 32 thus are part of a heat exchanger interposed between sump 41 and sprayhead 43 for cooling water sprayed into direct contact heat exahanger 40. Additionally, fined tubes 32 are part of an air cooled heat exchanger.

instead of an air cooled heat exchanger, the water being sprayed from sprayheads 43 could be cooled in indirect contact, water cooled condenser 31C shown in FIG. 2C. That is to say, condenser 31C is an indirect heat exchnger in which hot, compressed steam from compressor 27 enters inlet 50 of the heat exchanger, and is condensed into water as a result. The condensate exits at outlet 51. The heat in the vapor is extracted by cooling water that enters at 52 and exits at 53.

insteaad of disposing of the cooling water used in condenser 31C, a cooing tower can be utilized for recirculating the cooling water. This technique is illustrated in FIG. 2D wherein cooling tower 54 is shown in association with condenser 31C. Specifically, wwarmed water exiting the outlet 53 of the heat exchanger is applied to cooling tower 55 where the water is usually sprayed into ambient air transferring the heat absorbed in the condenser to the air. The resultant cooled water falls into reservoir 56 where pump 57 returns the water to inlet 52 of the condenser. Make-up water preferably is supplied to reservoir 56 to make-up for water lost in the cooling process.

Figure 2E:
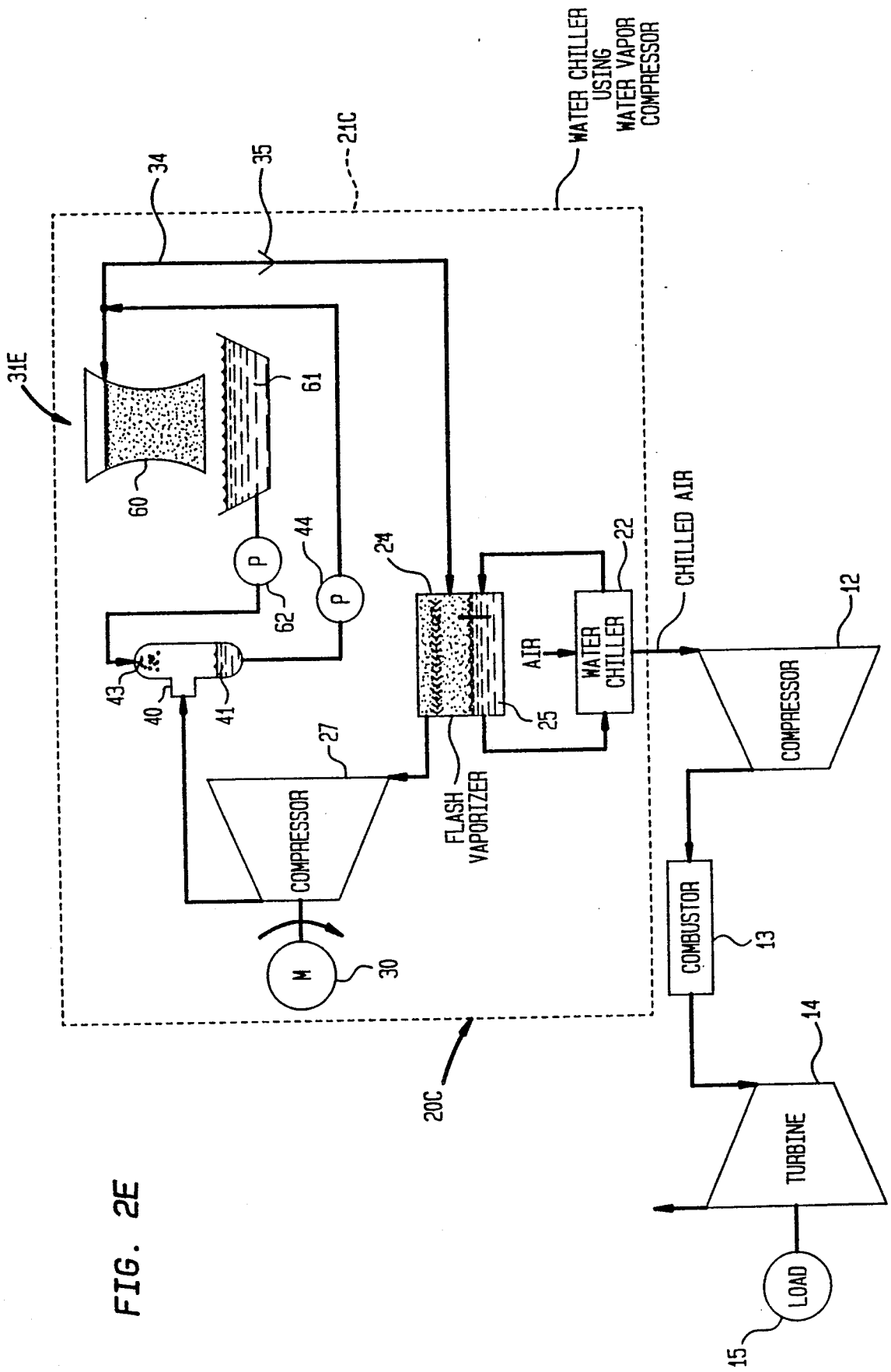
FIG. 2E is a third embodiment of an air chiller according to the present invention.

FIG. 2E of the drawing shows the incorporation of a cooling tower into a water chiller according to the present invention wherein a direct contact condenser is utilized for the vapor compressor of the water chiller. The embodiment shown in FIG. 2E operates similar to the embodiment illustrated in FIG. 2D except that condenser 31E utilized a cooling tower for cooling the water used in condenser 40. Specifically, the water applied to sprayhead 43 is cooled using cooling tower 60 to which water is supplied via operation of pump 44. Water cooled by air, usually ambient air, collects in reservoir 61 from which pump 62 furnishes water to sprayhead 43.

Figure 3:
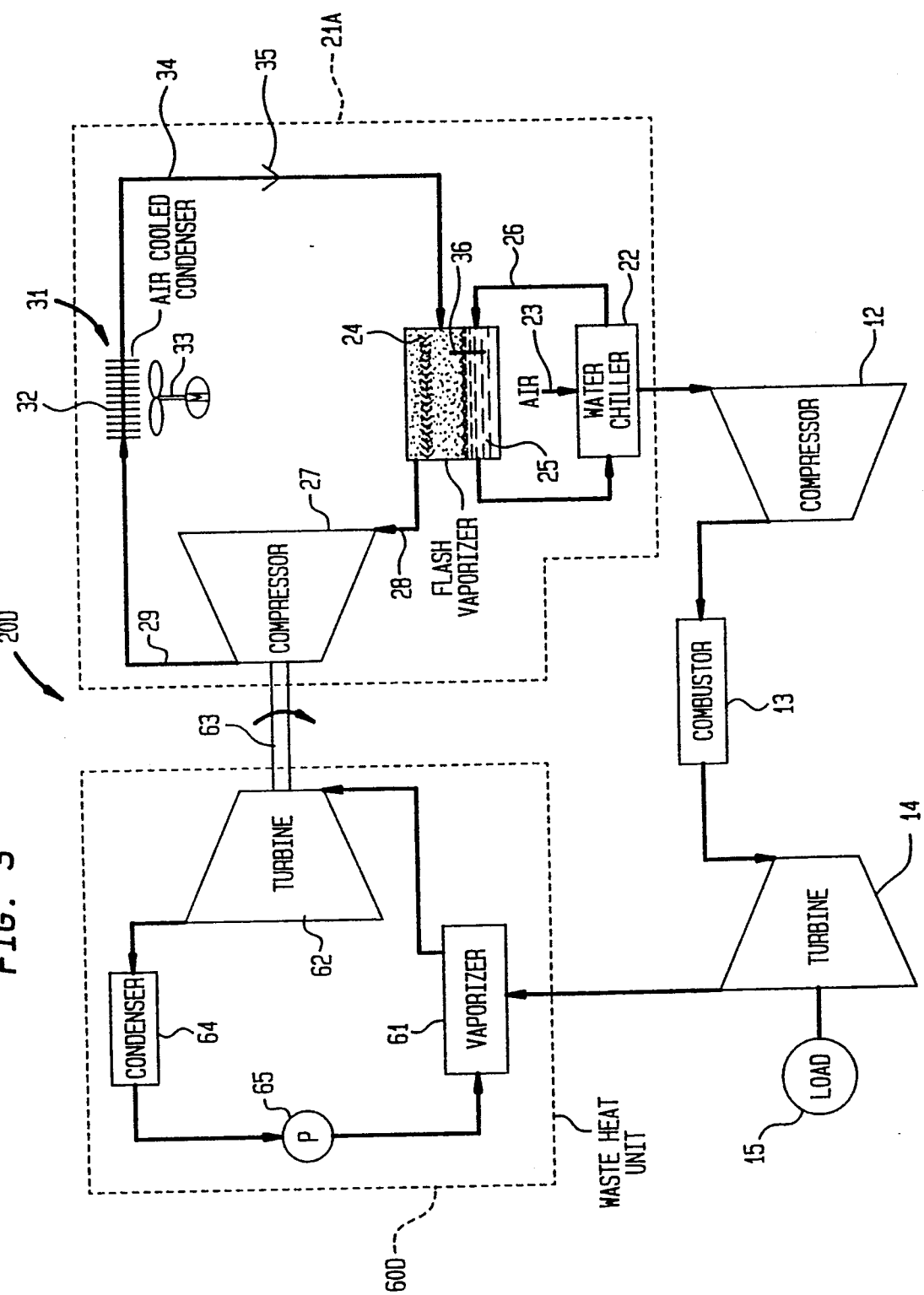
FIG. 3 is a further embodiment of apparatus according to the present invention.

Power plant 20D in FIG. 3, presently considered to be the best mode of the present invention, includes chiller 21D which provides chilled air to the inlet of compressor 12. Chiller 21D operates in the manner shown in FIG. 2, and more particularly in a manner shown in FIG. 2A in that air is supplied via indirect contact heat exchanger 22D to the inlet of compressor 12. Water vapor produced by flash vaporizer 24D is applied to compressor 27 which compresses the vapor and supplies the same to condenser 31D where condensation takes place. The liquid condensate is then returned through a restriction valve to vaporizer 24D. Compressor 27, in this embodiment, is driven by waste heat unit 60D that operates on the exhaust gases produced by turbine 14.

Waste heat unit 60D preferably operates on a closed Rankine cycle utilizing, preferably, an organic working fluid, typically pentane. Isobutane or propane may also be used. Unit 60D vaporizer 61 is responsive to exhaust gases from gas turbine 14 for vaporizing the organic working fluid which is supplied to auxiliary turbine 62 mechanically coupled via shaft 63 to auxiliary compressor 27 of chiller 21D. Turbine 62 is responsive to the vaporized working fluid produced by vaporizer 61 for driving compressor 27 as the vaporized working fluid expands to heat depleted, vaporized working fluid which is supplied to condenser 64 where condensation takes place. The condensate is transferred by pump 65 back into vaporizer 61 where the cycle repeats. Condenser 64 preferably is an air cooled condenser but a water cooled condenser is also possible. If desired, working fluids other than organic fluids can be used, such as water, ammonia, etc. It is particularly advantageous when water is used both as the working fluid for the waste heat unit, and as the fluid in the chiller. First, the same fluid is used in both cycles. Second, water is commonly available and its use gives rise to other advantages, such as simpler seals, etc.

In operation, ambient air passes through water chiller 22D and the temperature of the air is reduced to the desired level before being applied to the inlet of compressor 12. The chilled air is compressed and supplied to combustor 13 where fuel is burned producing hot gases in drive turbine 14 which powers load 15. The exhaust gases from the turbine pass through vaporizer 61 before being vented to the atmosphere. Heat contained in these gases is converted into work by reason of the vaporized working fluid which is applied to turbine 62 directly driving compressor 27 of the chiller.

Figure 3A:
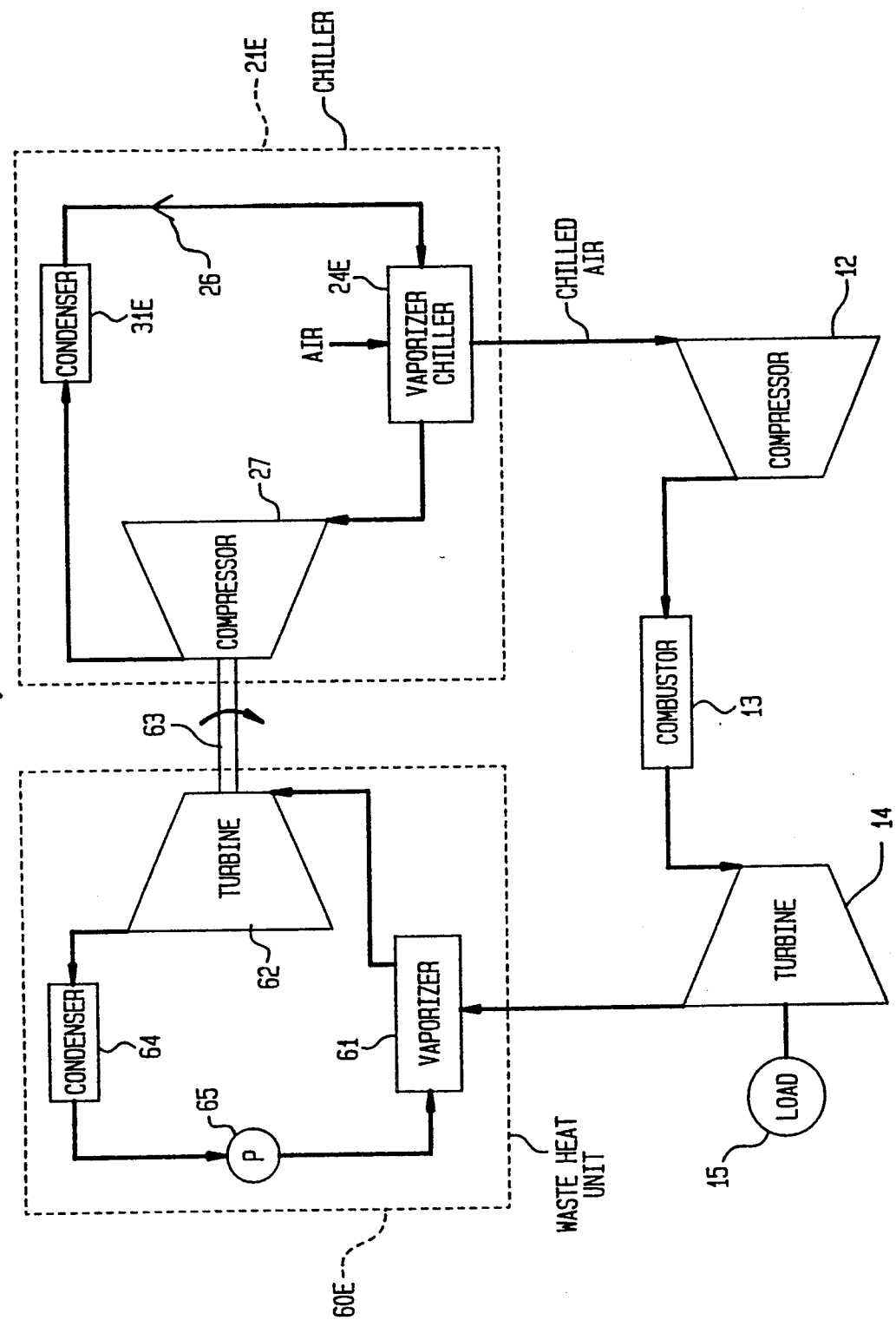
FIG. 3A is a still further embodiment of apparatus according to the present invention.

While waste heat unit 60D is shown as operating chiller 21D, unit 60D can operate with any of the embodiments shown in FIGS. 2A-E. In such cases, motor 30 can be replaced by waste heat unit 60D for operating compressor 27 which forms part of chillers 21A, 21B, and 21E respectively. Furthermore, as shown in FIG. 3A, waste heat unit 60E can be used to operate a compressor contained in the chiller which would be a conventional one operating on conventional refrigerants such as the Freons. In addition, other organic fluids which do not damage the ozone layer, such as pentane, isobutane, propane, etc. also can be used as the refrigerant for the chiller.

Power plant 20E in FIG. 3A includes chiller 21E which provides chilled air to the inlet of compressor 12. Chiller 21E operates such that vaporizer 24E vaporizes the refrigerant by extracting heat from the ambient air before the latter is applied to compressor 12. Vapor produced in vaporizer 24E is applied to compressor 27 which compresses the vapor and supplies the same to condenser 31E where the vapor condenses. The condensate flows through expansion valve 26 to vaporizer 24E. Compressor 27, in this embodiment, is driven by waste heat unit 60E that operates on the exhaust gases produced by turbine 14.

Waste heat unit 60E in this embodiment, operates on a closed Rankine cycle utilizing, preferably, an organic working fluid, typically pentane. Vaporizer 61 of unit 60E is responsive to exhaust gases from gas turbine 14 for vaporizing the organic working fluid which is supplied to auxiliary turbine 62 mechanically coupled via shaft 63 to auxiliary compressor 27 of chiller 21E. Turbine 62 is responsive to the vaporized working fluid produced by vaporizer 61 for driving compressor 27 as the vaporized working fluid expands to heat depleted, vaporized working fluid which is supplied to condenser 64 where condensation takes place. The condensate is transferred by pump 65 back into vaporizer 61 where the cycle repeats. Condenser 64 preferably is an air cooled condenser but a water cooled condenser is also possible. If desired, working fluids other than organic fluids can be used, such as water, ammonia, etc.

In the operation of this embodiment, ambient air passes through water chiller 24E and the temperature of the air is reduced to the desired level before being applied to the inlet of compressor 12. The chilled air is compressed and supplied to combustor 13 where fuel is burned producing hot gases in drive turbine 14 which powers load 15. The exhaust gases from the turbine pass through vaporizer 61 before being vented to the atmosphere. Heat contained in these gases is converted into work by reason of the vaporized working fluid which is applied to turbine 62 directly driving compressor 27 of the chiller.

The advantages and improved results furnished by the method and apparatus of the present invention are apparent from the foregoing description of the preferred embodiment of the invention. Various changes and modifications may be made without departing from the spirit and scope of the invention as described in the appended claims.

What is claimed is:

1. Apparatus for augmenting power produced by a gas turbine system of the type having an air compressor for producing compressed air, a combustor for heating the compressed air to produce hot gases, a gas turbine responsive to said hot gases for driving said air compressor and a load, and for producing exhaust gases, said apparatus comprising:
   a) means for cooling air supplied to the compressor;
   b) said means for cooling comprising:
      (1) an indirect contact heat exchanger through which air is supplied to said compressor;
      (2) a closed reservoir containing water;
      (3) means for exchanging water between said reservoir and said heat exchanger;
      (4) an auxiliary compressor having an inlet connected to said reservoir, and having an outlet;

(5) drive means for operating said auxiliary compressor to reduce the pressure in said reservoir thereby producing water vapor which reduces the temperature of the water remaining in the reservoir, said water vapor being compressed by the operation of said auxiliary compressor to produce heated, compressed water vapor at said outlet;

(6) a condenser connected to said outlet for condensing said heated compressed water vapor; and (7) means connecting said condenser to said reservoir for returning the condensed water vapor produced by said condenser to said reservoir.

2. Apparatus according to claim 1 wherein said drive means include:

a) a vaporizer containing liquid working fluid and responsive to exhaust gases from said gas turbine for producing vaporized working fluid from liquid working fluid;

b) an auxiliary turbine mechanically coupled to said auxiliary compressor and responsive to said vaporized working fluid for expanding the latter to drive said auxiliary compressor and producing heat depleted working fluid;

c) an auxiliary condenser responsive to said heat depleted working fluid for condensing the same; and e) means for pumping condensate from said auxiliary condenser to said vaporizer.

3. Apparatus according to claim 1 wherein said condenser is air cooled.

4. Apparatus according to claim 1 wherein said condenser is liquid cooled.

5. Apparatus according to claim 2 wherein said condenser comprises:

a) a direct contact heat exchanger having a sump containing water and a sprayhead;

b) a pump for pumping some of the water from said sump to said reservoir and some to said sprayhead for contacting heated compressed water vapor with droplets produced by said sprayhead; and c) a heat exchanger interposed between said sump and said sprayhead for cooling water in said sump.

6. Apparatus according to claim 5 wherein said heat exchanger interposed between said sump and said sprayhead is air cooled.

7. Apparatus according to claim 5 wherein said heat exchanger interposed between said sump and said sprayhead is liquid cooled.

8. Apparatus according to claim 7 including a cooling tower for cooling said liquid.

9. Apparatus according to claim 4 including a cooling tower for cooling said liquid.

10. A method for augmenting the power produced by a gas turbine system of the type having an air compressor for producing compressed air, a combutor for heating said compressed air, and a gas turbine responsive to the heated air for drifving said air compressor and a load for producing exhaust gases, said method including the steps of cooling air supplied to said compressor by indirectly contacting said air with water that is chilled by flashing some of the water into a vapor, and compressing vapor produced by flashing water to produce heated, compressed steam, cooling the heated compressed steam to produce a liquid, and expanding said liquid to a vapor.

11. A method according to claim 10 wherein cooling the heated compressed steam is achieved by transferring heat to ambient air.

12. A method according to claim 10 wherein cooling the heated compressed steam is achieved by transferring heat to cooling water.

13. A method according to claim 10 wherein the vapor is compressed using heat extracted from the exhaust gases produced by said gas turbine.

14. Apparatus according to claim 1 wherein said means connecting said condenser to said reservoir includes a nozzle through which said condensed water vapor passes before entering said reservoir.

15. Apparatus according to claim 14 wherein said closed reservoir includes a baffle for partially separating said reservoir into two portions, and said means connecting said condenser to said reservoir is contructed and arranged so that the output of said nozzle enters said one portion of said reservoir wherein the water is warmer than in the other portion of said reservoir.

* * * * *